(12) United States Patent
Chikaoka

(10) Patent No.: US 9,683,567 B2
(45) Date of Patent: Jun. 20, 2017

(54) ELECTRIC OIL PUMP

(71) Applicant: Hitachi Automotive Systems, Ltd., Hitachinaka-shi, Ibaraki (JP)

(72) Inventor: Takayuki Chikaoka, Isesaki (JP)

(73) Assignee: Hitachi Automotive Systems, Ltd., Hitachinaka-shi (JP)

(*) Notice: Subject to any disclaimer, the term of this patent is extended or adjusted under 35 U.S.C. 154(b) by 0 days.

(21) Appl. No.: 14/773,548

(22) PCT Filed: Jan. 6, 2015

(86) PCT No.: PCT/JP2015/050087
§ 371 (c)(1),
(2) Date: Sep. 8, 2015

(87) PCT Pub. No.: WO2015/133157
PCT Pub. Date: Sep. 11, 2015

(65) Prior Publication Data
US 2016/0076539 A1   Mar. 17, 2016

(30) Foreign Application Priority Data
Mar. 4, 2014   (JP) .................................. 2014-041348

(51) Int. Cl.
*F04C 15/00* (2006.01)
*F01M 1/02* (2006.01)
(Continued)

(52) U.S. Cl.
CPC ........... *F04C 15/0088* (2013.01); *F01M 1/02* (2013.01); *F04C 2/10* (2013.01); *F04C 2/102* (2013.01);
(Continued)

(58) Field of Classification Search
CPC ............ F01M 1/02; F01M 2001/0215; F01M 2001/0238; F04C 15/008; F04C 15/0088;
(Continued)

(56) References Cited

U.S. PATENT DOCUMENTS

| | | | |
|---|---|---|---|
| 2006/0024188 A1* | 2/2006 | Muscarella | F04C 2/084 418/206.1 |
| 2011/0234025 A1* | 9/2011 | Kado | H02K 5/08 310/43 |
| 2011/0293442 A1* | 12/2011 | Tatewaki | F16H 61/0025 417/279 |

FOREIGN PATENT DOCUMENTS

| | | | |
|---|---|---|---|
| JP | 2000-145663 A | 5/2000 | |
| JP | 2006-316674 A | 11/2006 | |

(Continued)

OTHER PUBLICATIONS

English-language translation of document C1 (International Search Report (PCT/ISA/210)) issued in PCT Application No. PCT/JP2015/050087 dated Apr. 14, 2015 previously filed on Sep. 8, 2015 (one (1) page).

(Continued)

*Primary Examiner* — Dominick L Plakkoottam
(74) *Attorney, Agent, or Firm* — Crowell & Moring LLP

(57) ABSTRACT

A drive rotation shaft is rotatably supported by a first slide bearing between a rotor part and a pump rotor, and is rotatably supported by a second slide bearing on its distal end side of a pump rotor fixing part of the drive rotation shaft. Working oil is supplied to the first slide bearing and the second slide bearing. According to this configuration, since the distal end side of the drive rotation part is rotatably supported by the second slide bearing, inclination of the drive rotation shaft is restricted by an inner peripheral surface of the second slide bearing, thereby suppressing occurrence of noise.

16 Claims, 7 Drawing Sheets

(51) Int. Cl.
*F04C 2/10* (2006.01)
*H02K 5/173* (2006.01)
*F04C 11/00* (2006.01)
*F04C 23/00* (2006.01)

(52) U.S. Cl.
CPC ....... *F04C 15/0042* (2013.01); *H02K 5/1732* (2013.01); *F01M 2001/0215* (2013.01); *F01M 2001/0238* (2013.01); *F04C 11/008* (2013.01); *F04C 15/008* (2013.01); *F04C 23/008* (2013.01); *F04C 2240/30* (2013.01); *F04C 2240/52* (2013.01)

(58) Field of Classification Search
CPC ...... F04C 2/10; F04C 11/008; F04C 2240/30; F04B 53/16; F04B 53/18; H02K 5/1732
See application file for complete search history.

(56) References Cited

FOREIGN PATENT DOCUMENTS

JP  2012-207638 A  10/2012
JP  2013-199849 A  10/2013

OTHER PUBLICATIONS

Japanese-language International Search Report (PCT/ISA/210) dated Apr. 14, 2015 (two (2) pages).
Japanese-language Written Opinion (PCT/ISA/237) dated Apr. 14, 2015 (three (3) pages).

* cited by examiner

ELECTRIC OIL PUMP

TECHNICAL FIELD

The present invention relates to an electric oil pump, and particularly to an electric oil pump in which working oil is supplied from a discharge part to a bearing part bearing a pump drive rotation shaft.

BACKGROUND ART

In recent years, with increasing demand for lowering fuel consumption of automotive vehicles, automotive vehicles provided with idle stop functions and hybrid vehicles have become commercially practical. Such a vehicle requires a pump drive source in addition to an internal combustion engine, because various pumps driven by the internal combustion engine are at rest when the internal combustion engine is at rest. Especially, in cases of automotive vehicles provided with idle stop functions and hybrid vehicles, an oil pump is required to ensure oil pressure of a hydraulic mechanism controlling a transmission. In view of the foregoing, an electric oil pump, which applies a torque to a pump rotor by an electric motor, tends to be in increasing use.

Conventionally, as an electric oil pump mounted in a transmission of an automotive vehicle, a trochoid type internal gear pump is frequently adopted. The internal gear pump is a pump in which a pump rotor is rotated by a drive rotation shaft driven by an electric motor, and an outer rotor having internal teeth meshing with external teeth of the pump rotor is thereby rotated, so that a plurality of chambers formed between the internal teeth of the outer rotor and the external teeth of the pump rotor continuously vary in volume, and thereby suck and discharge working oil. Such an electric oil pump is described in JP 2012-207638 A (patent document 1), for example.

An electric oil pump includes: a drive control section for controlling energization to an electric motor; a stator part including a winding and an iron core for generating a magnetomotive force by energization from the drive control section; a rotor part in a space inside the stator part, including a permanent magnet, and configured to be rotated by the magnetomotive force; a drive rotation shaft fixed by press fitting or the like to the rotor part, and configured to rotate integrally with the rotor part; and a pump rotor part fixed by press fitting or the like to the drive rotation shaft, and configured to rotate integrally with the drive rotation shaft. A bearing part for the drive rotation shaft is formed with an oil groove for introducing working oil from a discharge part, and thereby forming an oil film on a rotation slide surface of the drive rotation shaft.

PRIOR ART DOCUMENT(S)

Patent Document(s)

Patent Document 1: JP 2012-207638 A

SUMMARY OF THE INVENTION

As described above, in an automotive vehicle provided with an idle stop function or a hybrid vehicle, an electric oil pump is operating under a condition in which an internal combustion engine is at rest. Since the internal combustion engine causes no operation sound under that condition, an operation sound caused by the electric oil pump is noisy to a passenger in a vehicle interior. Accordingly, it is desired to minimize the operation sound of the electric oil pump.

The present inventor and others made studies and revealed that inclination of the drive rotation shaft was a factor for causing the operation sound of the electric oil pump. Specifically, as in patent document 1, the drive rotation shaft is rotatably supported by an one-side slide bearing, so that the drive rotation shaft is inclined in a clearance between an inner peripheral surface of the slide bearing and an outer peripheral surface of the drive rotation shaft, and unevenness occurs in a clearance (air gap) between the stator part and the rotor part, and it causes a disturbance in a spatial magnetic flux wave, and thereby causes harmonic components. The harmonic components become a factor for increasing an electromagnetic exciting force in a radial direction and causing vibration, and thereby cause noise.

In order to reduce inclination of the drive rotation shaft, it is conceivable to minimize the clearance between the inner peripheral surface of the slide bearing and the outer peripheral surface of the drive rotation shaft. However, it causes a new problem that because of the slide bearing, excessive reduction of the clearance causes shortage of supply of lubricating oil, and thereby causes seizing, or increasing a manufacturing cost (by employment of precision machining). On the other hand, in a case where the drive rotation shaft is rotatably supported by a ball bearing, it is possible to suppress inclination of the drive rotation shaft to some extent, but the use of the ball bearing causes a new problem of causing an increase in the number of parts, and an increase in the parts cost, and a necessity to ensure a space where the ball bearing is mounted for the drive rotation shaft. Moreover, rotation of the ball bearing may cause a noise called cry.

It is an object of the present invention to provide a new electric oil pump in which inclination of a drive rotation shaft is suppressed by a simple configuration so that noise is small.

The present invention is characterized in that a drive rotation shaft is rotatably supported by a first slide bearing between a rotor part and a pump rotor, and is rotatably supported by a second slide bearing on its distal end side of a pump rotor fixing part of the drive rotation shaft, and working oil is supplied to the first slide bearing and the second slide bearing.

According to the present invention, the feature that the distal end side of the drive rotation shaft is rotatably supported by the second slide bearing serves to restrict inclination of the drive rotation shaft by an inner peripheral surface of the second slide bearing, and thereby suppress the occurrence of noise. Additionally, since the provision of the slide bearing is sufficient, the configuration becomes simple.

MODE(S) FOR CARRYING OUT THE INVENTION

Although the following describes embodiment(s) of the present invention in detail with reference to drawings, the present invention is not limited to the following embodiment(s), but includes various modifications and applications within a technical concept of the present invention.

The following describes an electric oil pump according to an embodiment of the present invention with reference to the drawings. For example, the electric oil pump is a pump mounted for an automatic transmission of a vehicle provided with an idle stop function. The automatic transmission is a belt-type continuously variable transmission, and a mechanical pump is additionally provided which is driven by an engine.

When the engine is at rest under idle stop control, it is impossible to ensure oil pressure by the mechanical pump. When oil pressure becomes lower due to leakage or the like from frictional engagement elements and pulleys in the belt-type continuously variable transmission, it takes time to provide oil pressure required for restarting, thereby degrading the drivability. Accordingly, in addition to the mechanical pump, the electric oil pump is provided to discharge oil pressure irrespective of operating state of the engine, and thereby ensure oil pressure for compensation for leakage from the frictional engagement elements and pulleys, and thereby enhance the drivability when the engine is restarted and when the vehicle is restarted.

Figure 1:
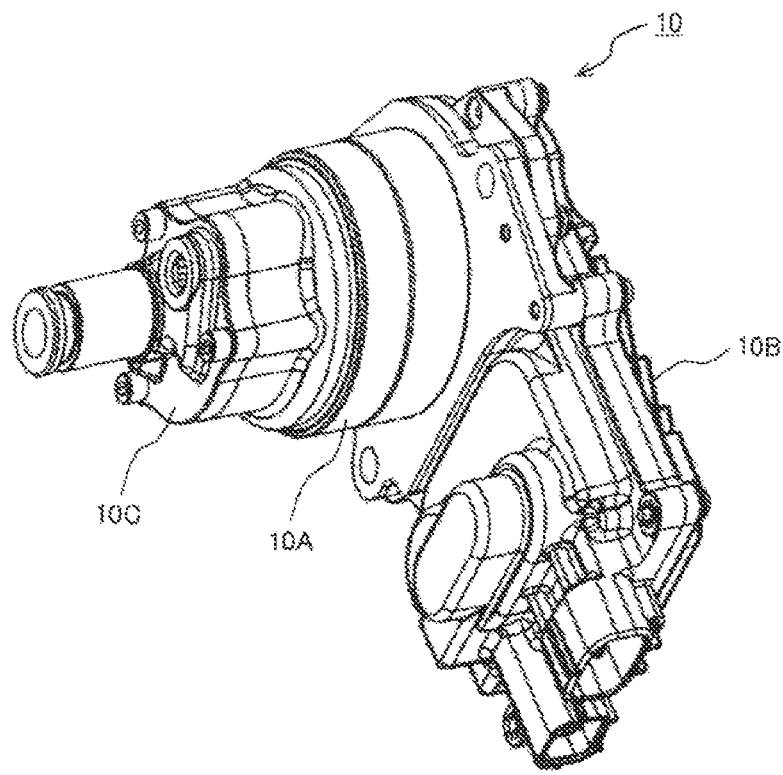
FIG. 1 is a whole perspective view of an electric oil pump according to the present invention.
Figure 2:
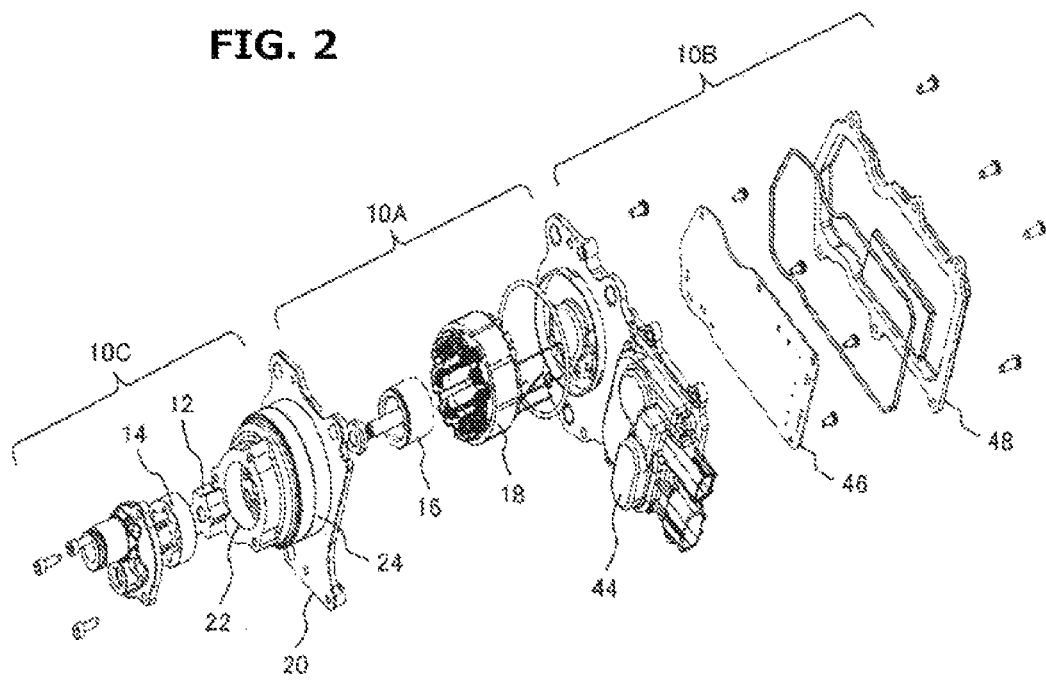
FIG. 2 is an exploded perspective view of the electric oil pump shown in FIG. 1.

FIG. 1 is a perspective view of whole configuration of the electric oil pump. FIG. 2 is an exploded perspective view of the electric oil pump. Electric oil pump 10 includes: an electric motor section 10A; a drive control section 10B next to and fixed to electric motor section 10A; a pump section 10C configured to be driven by electric motor section 10A.

As shown in FIG. 2, electric motor section 10A includes at least a rotor part 16 and a stator part 18. Electric motor section 10A is housed in an electric motor section housing part 24 formed in one side of a housing 20 made of metal such as aluminum alloy.

The other side of housing 20 is formed with a pump section housing part 22 housing the pump section 10C. Pump section 10C includes at least a pump rotor 12 having external teeth, and an outer rotor 14 having internal teeth. Pump rotor 12 and outer rotor 14 are housed in pump section housing part 22 formed in the other side of housing 20. Drive control section 10B includes at least: a cabinet 44; a control board 46 housed in cabinet 44; a cover 48 fixed to cabinet 44 to house the control board 46.

Figure 3:
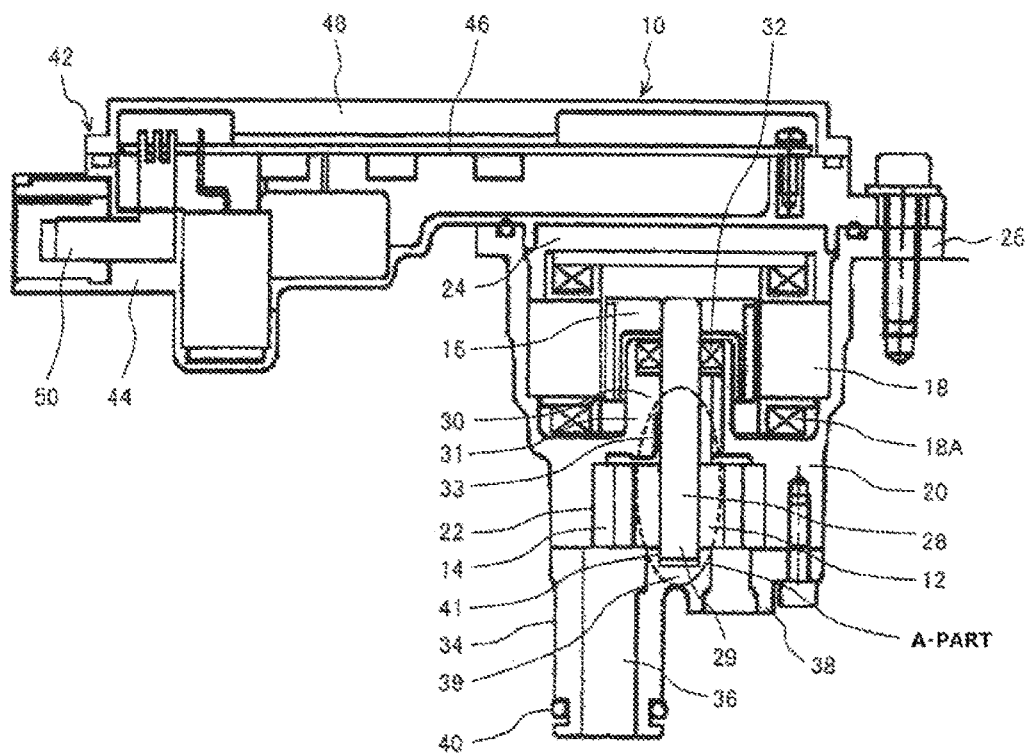
FIG. 3 is a longitudinal sectional view of the electric oil pump shown in FIG. 1.

The following further describes the structure of electric oil pump 10 in detail with reference to FIG. 3. Electric oil pump 10 includes: pump section 10C including pump rotor 12 having external teeth and outer rotor 14 having internal teeth; and electric motor section 10A including rotor part 16 coupled to pump rotor 12, and stator part 18. A winding 18A is wounded around stator part 18, and is put into drive control circuit (or drive control section) 42.

The pump section 10C and electric motor section 10A are housed respectively in pump section housing part 22 formed in a first end surface of housing 20, and in electric motor section housing part 24 formed in a second end surface of housing 20. Namely, housing 20 is formed with pump section housing part 22 on the first end surface side, which houses outer rotor 14 therein rotatably, and is formed with electric motor section housing part 24 on the second end surface side, which fixes stator part 18 inside of an opening, and is formed further with a bracket 26 outside of electric motor section housing part 24 in the axial direction, for attachment to the automatic transmission.

Moreover, a first bearing part 30 is formed in housing 20 for supporting rotatably the drive rotation shaft 28 that couples pump rotor 12 and rotor part 16 to each other. First bearing part 30 is configured so that its inner peripheral surface rotatably supports an outer peripheral surface of an intermediate portion of drive rotation shaft 28. The "intermediate portion" means a portion between pump rotor 12 and rotor part 16, and is not limited to the center of drive rotation shaft 28.

First bearing part 30 is formed in a separation wall 31 that separates pump section housing part 22 and electric motor section housing part 24 from each other. First bearing part 30 is a slide bearing, wherein a first clearance having a specific distance is formed between the inner peripheral surface of first bearing part 30 and the outer peripheral surface of drive rotation shaft 28, wherein working oil is introduced to the first clearance via a first oil introduction passage 33 from the discharge side high in pressure. In addition, a seal member 32 is provided above drive rotation shaft 28 and first bearing part 30 for sealing the drive rotation shaft 28.

Pump cover 34 includes: a discharge port 36 extending in the form of a cylindrical tube communicating with a discharge opening of pump section 10C; and a suction port 38 communicating with a suction opening of pump section 10C. A seal ring 40 is attached to an outer periphery of a distal end of discharge port 36.

A land portion 39 separates discharge port 36 and suction port 38 from each other in pump cover 34, and is formed with a second bearing part 41. Second bearing portion 41 rotatably supports a distal end portion 29 of drive rotation shaft 28 that is located on a distal side of a fixing portion to which pump rotor 12 is fixed. The second bearing part 41 is a slide bearing, wherein a second clearance having a predetermined distance is formed between an inner peripheral surface of second bearing part 41 and an outer peripheral surface of drive rotation shaft 28, wherein working oil is introduced to the second clearance via a second oil introduction passage not shown from a suction side. In FIG. 3, an A-part circled by a broken elliptic line is a major part of the present embodiment, which is described further in detail below with reference to FIG. 4.

Cabinet 44 constituting the drive control section 42 is fixed to electric motor section housing part 24 of housing 20 to tightly seal the electric motor section housing part 24. Incidentally, drive control section 10B shown in FIGS. 1 and 2 is identical to drive control section 42 shown in FIG. 3. Drive control section 42 includes: cabinet 44 made of synthetic resin, and fixed to housing 20; control board 46 housed in cabinet 44; and cover 48 made of synthetic resin, and fixed to cabinet 44 to cover the control board 46. An inverter circuit is mounted to control board 46 for supplying a controlled electric current to winding 18A wounded around stator part 18 of electric motor section 10A. A connector terminal 50 is disposed between cabinet 44 and cover 48, and configured to supply electric power to control board 46.

In electric oil pump 10 described above, a winding beginning portion and a winding ending portion of winding 18A wounded around stator part 18 constituting the electric motor section 10A are connected to an input terminal not shown and a neutral terminal not shown, which are formed in cabinet 44, via insertion holes not shown formed in cabinet 44 of drive control section 42 that is next to and fixed to electric motor section housing part 24. Accordingly, a drive signal is controlled by the inverter circuit and supplied to winding 18A, to cause the rotor part 16 of electric motor section 10A to rotate, and finally cause the pump rotor 12 to rotate to perform a pumping action.

Figure 4:
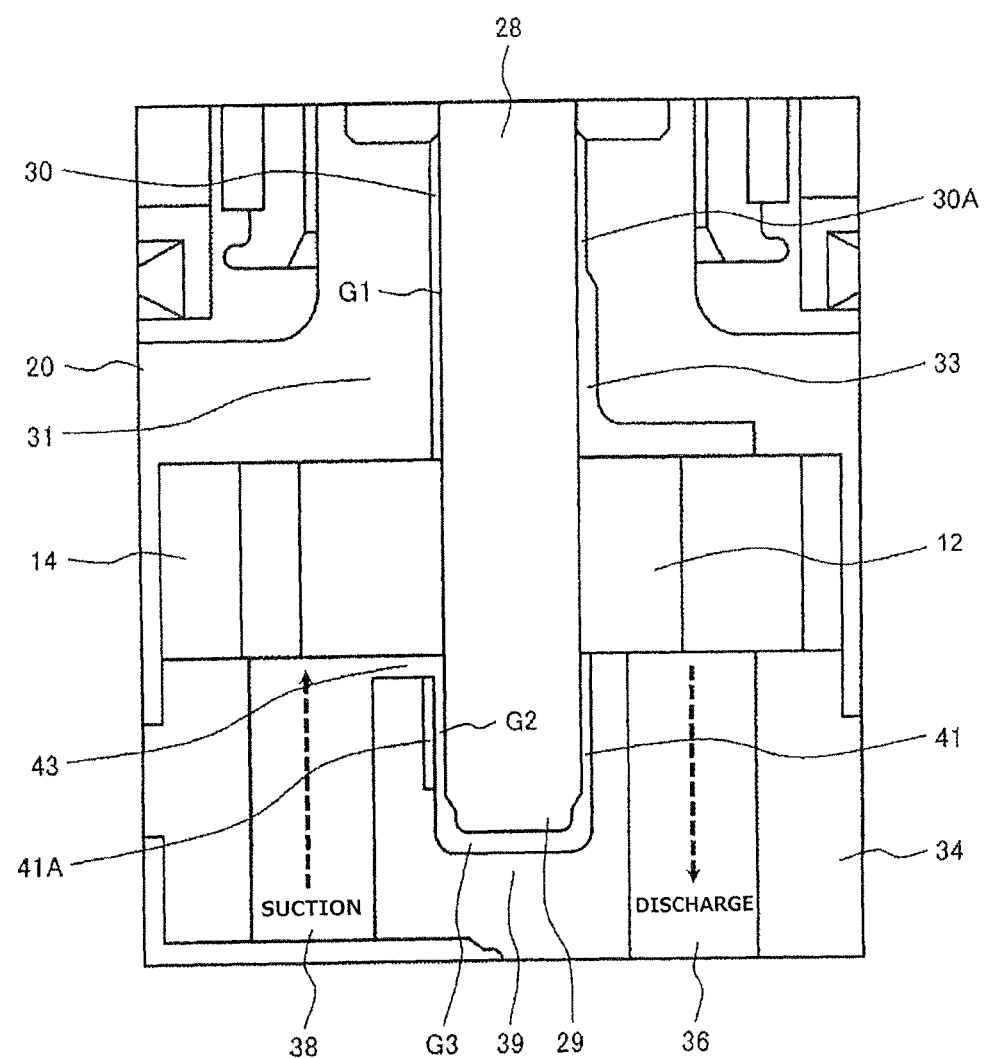
FIG. 4 is an enlarged sectional view of an Apart shown in FIG. 3.

The following describes detailed configuration of the A-part shown in FIG. 3 and its operation with reference to FIG. 4. As shown in FIG. 3, a part of separation wall 31 of housing 20 is formed with first bearing part 30. First bearing part 30 is located between pump rotor 12 and rotor part 16 constituting the electric motor section 10A, and rotatably supports drive rotation shaft 28 at this position, wherein drive rotation shaft 28 couples pump rotor 12 and rotor part 16 to each other. First bearing part 30 is a slide bearing, wherein the inner peripheral surface of first bearing part 30 and the outer peripheral surface of drive rotation shaft 28 are configured to slide relative to each other with first clearance G1. The first clearance G1 is supplied with working oil from first oil introduction passage 33 in communication with discharge port 36. The inner peripheral surface of first bearing part (slide bearing) 30 is formed with an oil groove 30A along drive rotation shaft 28. The oil groove 30A is supplied with working oil from first oil introduction passage 33. Thereby, an oil film is formed in first clearance G1, to enable a function of slide bearing.

The land portion 39 that separates discharge port 36 and suction port 38 from each other in pump cover 34 is formed with second bearing part 41 that rotatably supports distal end portion 29 of drive rotation shaft 28. Second bearing part 41 is in the form of a circular recess, in which distal end portion 29 of drive rotation shaft 28 is inserted and disposed. Second bearing part 41 is a slide bearing, wherein a second clearance G2 having a predetermined distance is formed between the inner peripheral surface of second bearing part 41 and the outer peripheral surface of drive rotation shaft 28. Working oil is introduced to the second clearance G2 from a suction port side via second oil introduction passage 43. The inner peripheral surface of second bearing part (slide bearing) 41 is formed with an oil groove 41A that is supplied with working oil from second oil introduction passage 43. Thereby, an oil film is formed in second clearance G2, to enable a function of slide bearing.

Moreover, a third clearance G3 is formed between a distal end surface of distal end portion 29 of drive rotation shaft 28 and a side end surface of the circular recess of second bearing part 41, and is supplied with working oil from the suction port side.

In this way, in the configuration of the present embodiment, drive rotation shaft 28 is rotatably supported at two places, i.e. the intermediate portion and distal end portion 29 of drive rotation shaft 28 by bearing parts 30 and 41 as slide bearings. Accordingly, when drive rotation shaft 28 is inclined around a proximity of first bearing part 30, the distal end portion 29 of drive rotation shaft 28 contacts the inner peripheral surface of second bearing part 41 so that the inclination of drive rotation shaft 28 is restricted. This serves to reduce variation (unevenness) of an air gap between stator part 18 and rotor part 16 as compared to the conventional configuration, and thereby suppress an increase of an electromagnetic exciting force in a radial direction, and thereby suppress the occurrence of noise.

Additionally, since the forming of two bearing parts 30, 41 implemented by slide bearings is sufficient, the configuration can be simplified. It is also possible to suppress the number of parts and the parts cost as compared to cases where ball bearings or the like are employed, and thereby suppress the price per product in addition to the simplification of the configuration.

Figure 5:
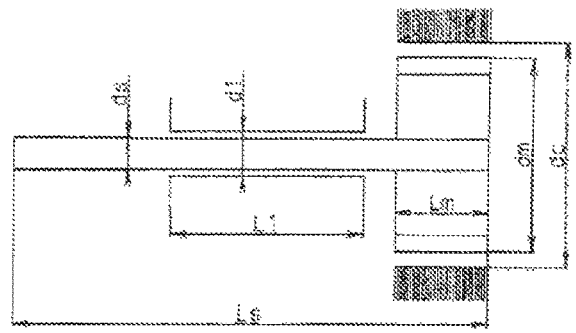
FIG. 5 is an illustrative diagram illustrating inclination of a drive rotation shaft in a patent document 1.
Figure 5:
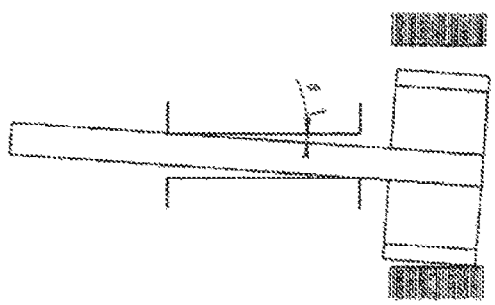
Figure 6:
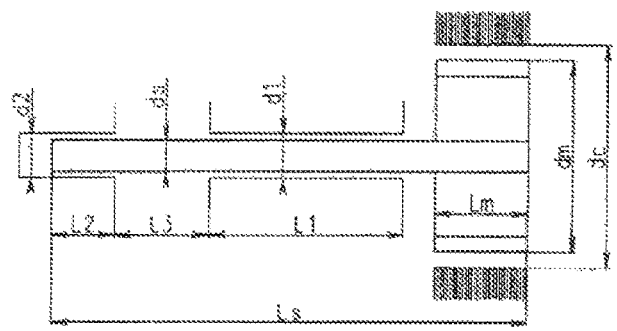
FIG. 6 is an illustrative diagram illustrating inclination of the drive rotation shaft shown in FIG. 3.
Figure 6:
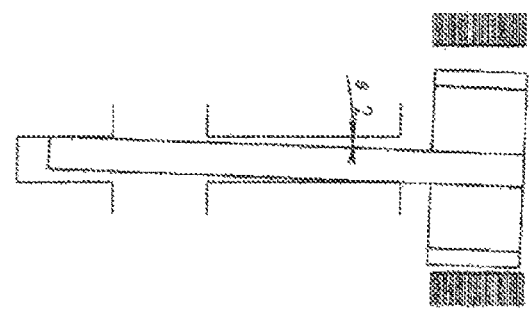

The following describes a difference in inclination of drive rotation shaft 28 between the electric oil pump described in patent document 1 and the electric oil pump according to the present embodiment, with reference to FIGS. 5 and 6. In this comparison, an inner diameter d1 and a bearing length L1 of the slide bearing between pump rotor 12 and rotor part 16, and an outer diameter ds of drive rotation shaft 28, and an outer diameter dm of rotor part 16, and an inner diameter dc of stator part 18 are the same therebetween. Moreover, the slide bearing constituting the second bearing part 41 in the present embodiment is assumed to have an inner diameter d2 and a bearing length L2. Herein, the inner diameters of both slide bearings are set equal to each other (d1=d2). Additionally, the interval distance between both slide bearings (where the pump rotor is arranged) is represented by L3.

FIG. 5 shows the case of the electric oil pump of patent document 1. Inclination θ1 of drive rotation shaft 28 is determined by the following equation (1).

$$\theta 1 = \tan^{-1}(C/L1) \quad (1)$$

where C represents a clearance distance between drive rotation shaft 28 and the slide bearing, namely, C=d1−d2.

On the other hand, FIG. 6 shows the case of the electric oil pump of the present embodiment. Inclination θ2 of drive rotation shaft 28 is determined by the following equation (2).

$$\theta 2 = \tan^{-1}(C/(L1+L2+L3)) \quad (2)$$

As understood from the above, in the present embodiment, since two slide bearings are employed, the bearing length is virtually equal to (L1+L2+L3), and thereby greater than bearing length L1 of the conventional example shown in FIG. 5. Accordingly, with regard to the inclination of drive rotation shaft 28, θ2<θ1 is satisfied so that the inclination is restricted to be smaller in the present embodiment.

Based on inclinations θ1, θ2, a minimum value of the air gap between stator part 18 and rotor part 16, AGmin, is determined as follows.

In the case of the electric oil pump shown in FIG. 5, an air gap minimum value AG1 min is determined by the following equation (3).

$$AG1\min = (dc-dm)/2 + C - (CLs/L1 - dm(1-\cos\theta 1)) \quad (3)$$

On the other hand, in the case of the electric oil pump shown in FIG. 6, an air gap minimum value AG2 min is determined by the following equation (4).

$$AG2\min = (dc-dm)/2 + C - (CLs/(L1+L2+L3) - dm(1-\cos\theta 2)) \quad (4)$$

When $\delta_1 = CL_s/L_1 \cdot dm(1-\cos\theta_1)$ and $\delta_2 = CL_s/(L_1+L_2+L_3) \cdot dm(1-\cos\theta_2)$ are defined, $\delta_1 > \delta_2$ results in AG1 min<AG2 min so that variation of the air gap is smaller in the present embodiment. Therefore, this makes it possible to suppress the unevenness of the air gap as a factor for generating the operation sound, and thereby reduce the operation sound resulting from the unevenness of the air gap.

Incidentally, it is conceivable to reduce the inclination of drive rotation shaft 28 by increasing the bearing length of the slide bearing shown in FIG. 5, but it causes a new problem that the length between stator part 18 and pump rotor 12 increases, and thereby causes the axial size of the whole electric oil pump to increase. This is disadvantageous in consideration that the electric oil pump is housed in an engine room in which a space for layout is limited.

In the present embodiment, by using the part L3, to which pump rotor 12 of drive rotation shaft 28 is fixed, virtually as a bearing length, the bearing length can be increased without increase of the size of the whole electric oil pump. Accordingly, as shown in FIG. 6, the inclination of drive rotation shaft 28 can be reduced, and as a result, variation of the air gap between rotor part 16 and stator part 18 can be reduced.

In this way, in the present embodiment, two portions of drive rotation shaft 28, namely, the intermediate portion and the distal end portion 29 of drive rotation shaft 28, which sandwich pump rotor 12, are rotatably supported by the slide bearings of bearing parts 30, 41, so that the bearing length is virtually increased. When drive rotation shaft 28 is inclined around the proximity of first bearing part 30, the distal end portion 29 of drive rotation shaft 28 contacts the inner peripheral surface of second bearing part 41 so that the inclination of drive rotation shaft 28 is restricted to be small. This serves to reduce variation (unevenness) of the air gap between stator part 18 and rotor part 16 as compared to the conventional configuration, and thereby suppress increase of the electromagnetic exciting force in the radial direction, and thereby suppress the occurrence of noise.

Figure 7:
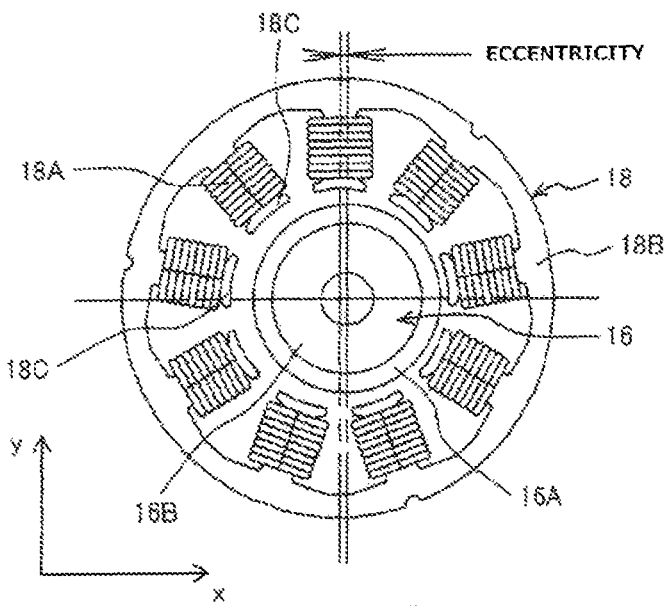
FIG. 7 is a sectional view showing a radial section of a rotor part and a stator part.

The following describes fluctuations of the electromagnetic force caused by variation of the air gap between stator part 18 and rotor part 16. FIG. 7 shows a cross-section of stator part 18 and rotor part 16, and shows a state in which rotor part 16 is eccentric.

The iron core 18B constituting the stator part 18 is made of layered silicon steel plates or the like, and includes nine salient pole parts 18C extending radially inwardly. Around the salient pole part, a bobbin part is formed of insulating synthetic resin. The bobbin part has a function to ensure insulation between salient pole part 18C and winding 18A wound around itself.

The winding 18A of each phase is wounded around the bobbin part covering the salient pole part 18C, and each bobbin part is therefore usually arranged in the order of the U-phase, the V-phase, and the W-phase. In the present embodiment, since the winding of each phase is divided into three, nine salient pole parts 18C are formed in iron core 18B, and arranged next to each other.

Rotor part 16 is disposed inside of salient pole parts 18C, wherein a permanent magnet 16B is disposed inside a back yoke 16A. FIG. 7 shows a situation where inclination of drive rotation shaft 28 causes back yoke 16A of rotor part 16 to be eccentric in an X direction among salient pole parts 18C of stator part 18, and thus causes unevenness of the air gap.

In that situation, when rotor part 16 rotates, the electromagnetic forces in the X direction and the Y direction fluctuate with the rotation angle (mechanical angle).

Figure 8:
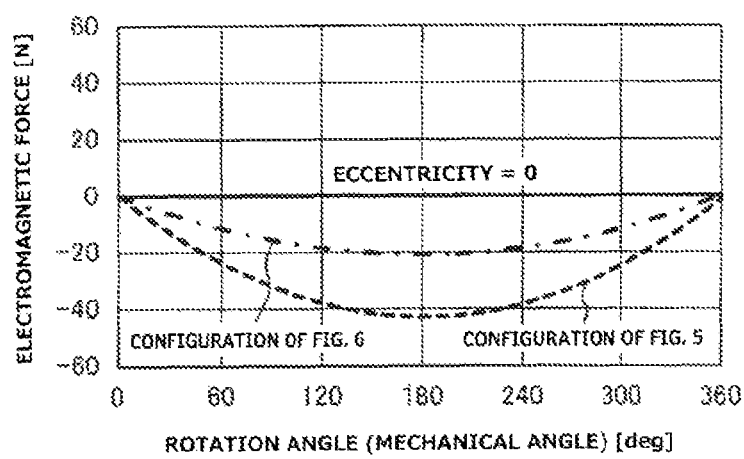
FIG. 8 is an illustrative diagram illustrating a relationship between a rotation angle and an electromagnetic force in an X direction on the radial section of the rotor part and the stator part.

FIG. 8 shows fluctuations of the electromagnetic force in the X direction during one rotation of rotor part 16. As compared to the case of eccentricity=0, the electromagnetic force fluctuates significantly in the conventional configuration of FIG. 5. On the other hand, the fluctuation of the electromagnetic force is smaller in the configuration of the present embodiment shown in FIG. 6. The fluctuation of the electromagnetic force in the X direction causes a rotational primary vibration, and thereby increases the sound.

Figure 9:
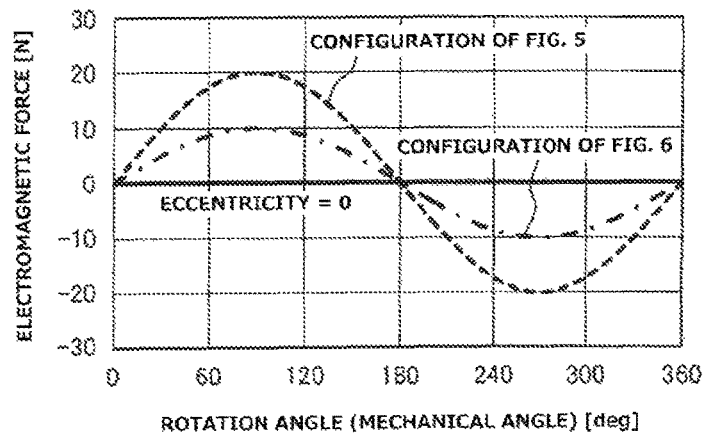
FIG. 9 is an illustrative diagram illustrating a relationship between a rotation angle and an electromagnetic force in a Y direction on the radial section of the rotor part and the stator part.

FIG. 9 shows fluctuations of the electromagnetic force in the Y direction during one rotation of rotor part 16. As compared to the case of eccentricity=0, the electromagnetic force fluctuates significantly in the conventional configuration of FIG. 5. On the other hand, the fluctuation of the electromagnetic force is smaller in the configuration of the present embodiment shown in FIG. 6. The fluctuation of the electromagnetic force in the Y direction causes a rotational secondary vibration, and thereby increases the sound. In this way, if the eccentricity of rotor part 16 can be reduced, the fluctuation of the electromagnetic force can be reduced, and as a result, the operation sound can be suppressed.

As described above, in the present embodiment, two portions of drive rotation shaft 28, namely, the intermediate portion and the distal end portion 29 of drive rotation shaft 28, which sandwich pump rotor 12, are rotatably supported by the slide bearings of bearing parts 30, 41. When drive rotation shaft 28 is inclined around the proximity of first bearing part 30, the distal end portion 29 of drive rotation shaft 28 contacts the inner peripheral surface of second bearing part 41, so that the inclination of drive rotation shaft 28 is restricted. This serves to reduce variation (unevenness) of the air gap between stator part 18 and rotor part 16 as compared to the conventional configuration, and thereby suppress increase of the electromagnetic vibration in the radial direction, and thereby suppress the occurrence of noise.

In the present embodiment, as shown in FIG. 6, by using the part L3, to which pump rotor 12 of drive rotation shaft 28 is fixed, virtually as a bearing length, the bearing length can be increased without increase of the size of the whole electric oil pump.

Additionally, since the forming of bearing parts 30, 41 implemented by slide bearings is sufficient, the configuration can be simplified. It is also possible to suppress the number of parts and the parts cost as compared to cases where ball bearings or the like are used, and thereby suppress the price per product in addition to the simplification of the configuration.

In the present embodiment, the inner diameter of the second bearing part 41 formed in land portion 39 of pump cover 34 is set equal to the inner diameter of first bearing part 30 formed in separation wall 31 of housing 20, However, if the inner diameter of second bearing part 41 is set smaller, the distance of second clearance G2 becomes smaller so that the inclination of drive rotation shaft 28 can be further reduced.

Moreover, the feature that second bearing part 41 is in the form of the circular recess serves to promote rise of the temperature of working oil. This allows to reduce the viscosity of working oil, and makes it easy for working oil to flow even in a narrow passage. This configuration is advantageous when the inner diameter of second bearing part 41 is set smaller so that the distance of second clearance G2 is set shorter.

Furthermore, the feature that drive rotation shaft 28 is rotatably supported by first bearing part 30 and second bearing part 41 serves to reduce the load to the bearings.

This is an effect by the extension of the bearing length, whereby it is possible to employ a metal material that is lower in hardness and lower in cost. Thus, it is possible to broaden the degree of freedom of material selection. Thereby, it can be expected that the unit price of the electric oil pump is suppressed to be low.

Next, the following describes configuration for positioning the pump cover 34 and housing 20 relative to each other. In the present embodiment, first bearing part 30 is formed in housing 20, whereas pump cover 34 is formed in pump cover 34. Accordingly, if the position of first bearing part 30 and second bearing part 41 relative to each other is deviated, drive rotation shaft 28 may be assembled under a condition that drive rotation shaft 28 is inclined. The inclination of drive rotation shaft 28 causes a phenomenon in which the operation sound gets larger. Therefore, it is important to assemble pump cover 34 and housing 20 in a normal state. The following describes this positioning mechanism.

Figure 10:
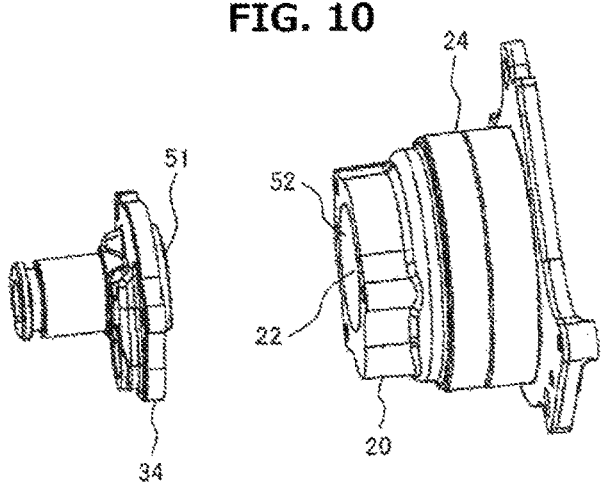
FIG. 10 is an exploded perspective view illustrating a configuration for positioning a pump housing and a pump cover relative to each other.

FIG. 10 shows an example in which a positioning projecting portion 51 in the form of a circular projection is formed in a surface of pump cover 34 in contact with housing 20. The positioning projecting portion 51 in the form of a circular projection is contacted to and fitted by spigot fitting with a wall surface of a circular positioning hole 52 formed in pump section housing part 22 in which outer rotor 14 of housing 20 is housed, thereby serving as a positioning mechanism for positioning the pump cover 34 and housing 20 relative to each other. This configuration serves to prevent the position of first bearing part 30 and second bearing part 41 from deviating from each other, and prevent drive rotation shaft 28 from being assembled with inclination.

Figure 11:
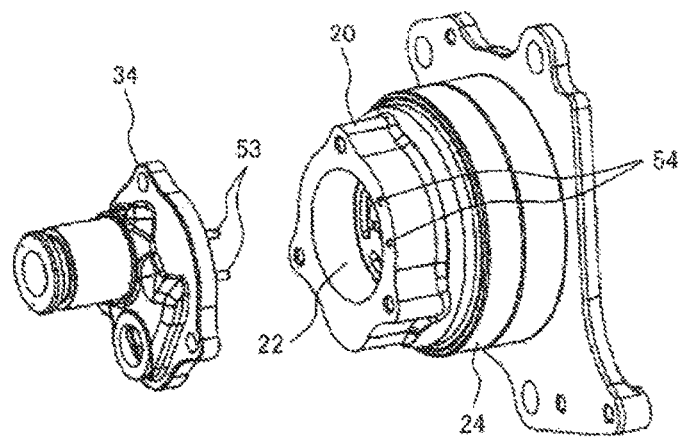
FIG. 11 is an exploded perspective view illustrating another configuration for positioning a pump housing and a pump cover relative to each other.

FIG. 11 shows an example in which at least two positioning pins 53 are formed in a surface of pump cover 34 in contact with housing 20. The positioning pins 53 are inserted into two positioning holes 54 formed in a surface of housing 20 in contact with pump cover 34, and thereby serves as a positioning mechanism to position pump cover 34 and housing 20 relative to each other. This configuration serves to prevent the position of first bearing part 30 and second bearing part 41 from deviating from each other, and prevent drive rotation shaft 28 from being assembled with inclination. Moreover, although the example of FIG. 10 requires to increase the size of pump section housing part 22 in the axial direction for the spigot fitting, the example of FIG. 11 does not require to increase the size of pump section housing part 22 in the axial direction, and does not require to change the axial length of the electric oil pump.

Figure 12:
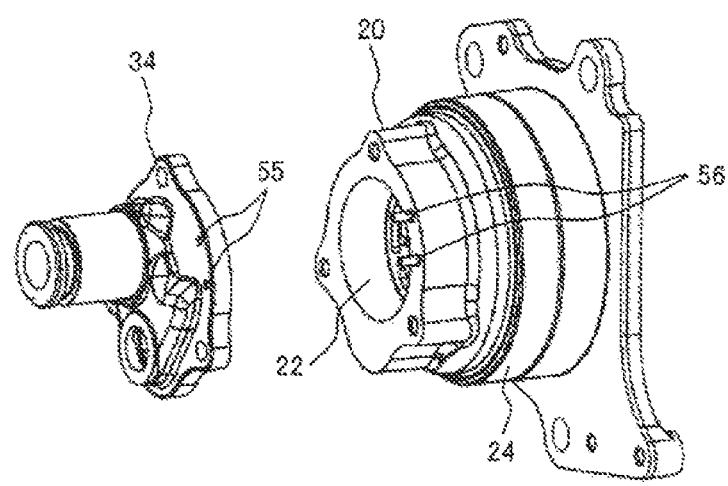
FIG. 12 is an exploded perspective view illustrating another configuration for positioning a pump housing and a pump cover relative to each other.

FIG. 12 shows an example in which at least two positioning holes 55 are formed in a surface of pump cover 34 in contact with housing 20. The positioning holes 55 receive insertion of two positioning pins 56 formed in a surface of housing 20 in contact with pump cover 34, and thereby serves as a positioning mechanism to position pump cover 34 and housing 20 relative to each other. This configuration serves to prevent the position of first bearing part 30 and second bearing part 41 from deviating from each other, and prevent drive rotation shaft 28 from being assembled with inclination. Moreover, similar to the example of FIG. 11, this example does not require to increase the size of pump section housing part 22 in the axial direction, and does not require to change the axial length of the electric oil pump.

In summary, the present invention is characterized in that the drive rotation shaft is rotatably supported by the first slide bearing between the rotor part and the pump rotor, and is rotatably supported by the second slide bearing on its distal end side of the pump rotor fixing part of the drive rotation shaft. Working oil is supplied to the first slide bearing and the second slide bearing.

According to this configuration, since the distal end side of the drive rotation part is rotatably supported by the second slide bearing, inclination of the drive rotation shaft is restricted by the inner peripheral surface of the second slide bearing, thereby suppressing occurrence of noise. Moreover, the configuration can be simplified, because it only requires that each of the housing and the pump cover is formed with a slide bearing.

The invention claimed is:

1. An electric oil pump comprising:
a pump section including a pump rotor and an outer rotor, wherein the pump rotor and the outer rotor are housed in a pump housing part formed in a housing;
an electric motor section including a rotor part and a stator part, wherein the rotor part includes a permanent magnet, and wherein the stator part includes an iron core and a winding;
a drive rotation shaft coupling the pump rotor and the rotor part to each other;
a first bearing part including a slide bearing supporting rotatably the drive rotation shaft between the pump rotor and the rotor part;
a first working oil introduction passage configured to supply working oil to the first bearing part; and
a pump cover fixed to the housing so as to cover the pump section, and including a discharge port and a suction port in communication with the pump section; wherein
the pump cover is formed with a second bearing part including a slide bearing supporting rotatably a distal end portion of the drive rotation shaft;
the distal end portion is on a distal side of a portion of the drive rotation shaft to which the pump rotor is fixed; and
a second working oil introduction passage is formed to supply working oil to the second bearing part; wherein
contact between the distal end portion of the drive rotation shaft and an inner peripheral surface of a land portion forming the second bearing part restricts inclination of the drive rotation shaft.

2. The electric oil pump as claimed in claim 1, wherein:
the first bearing part includes an inner peripheral surface formed with an oil groove connected to the first working oil introduction passage; and
the inner peripheral surface of the second bearing part is formed with an oil groove connected to the second working oil introduction passage.

3. The electric oil pump as claimed in claim 2, wherein:
the first working oil introduction passage is configured to be supplied with working oil from the discharge port; and
the second working oil introduction passage is configured to be supplied with working oil from the suction port.

4. The electric oil pump as claimed in claim 1, wherein:
the second bearing part is in a form of a circular recess; and
the distal end portion of the drive rotation shaft is accommodated in the circular recess.

5. The electric oil pump as claimed in claim 1, wherein the second bearing part has an inner diameter greater than an outer diameter of the drive rotation shaft and less than an inner diameter of the first bearing part.

6. The electric oil pump as claimed in claim 1, wherein a positioning mechanism is provided between the pump cover and the housing so as to position the first bearing part and the second bearing part with respect to each other.

7. The electric oil pump as claimed in claim 6, wherein:
the positioning mechanism includes a positioning projecting portion and a positioning hole;
the positioning projecting portion is formed as a circular projection in a surface of the pump cover in contact with the housing; and
the positioning hole is formed as a circular hole in the pump housing part of the housing on which the positioning projecting portion abuts.

8. The electric oil pump as claimed in claim 6, wherein:
the positioning mechanism includes a first configuration or a second configuration;
the first configuration includes a positioning pin and a positioning hole;
the positioning pin of the first configuration is planted in a surface of the pump cover in contact with the housing, and is inserted in the positioning hole of the first configuration;
the positioning hole of the first configuration is formed in a surface of the housing in contact with the pump cover;
the second configuration includes a positioning pin and a positioning hole;
the positioning pin of the second configuration is planted in a surface of the housing in contact with the pump cover, and is inserted in the positioning hole of the second configuration; and
the positioning hole of the second configuration is formed in a surface of the pump cover in contact with the housing.

9. An electric oil pump comprising:
a pump section including a pump rotor and an outer rotor, wherein the pump rotor and the outer rotor are housed in a pump housing part formed in a housing;
an electric motor section including a rotor part and a stator part, wherein the rotor part includes a permanent magnet, and wherein the stator part includes an iron core and a winding;
a drive rotation shaft coupling the pump rotor and the rotor part to each other;
a first bearing part including a slide bearing supporting rotatably the drive rotation shaft between the pump rotor and the rotor part;
a first working oil introduction passage configured to supply working oil to the first bearing part; and
a pump cover fixed to the housing so as to cover the pump section, and including a discharge port and a suction port in communication with the pump section; wherein
the pump cover is formed with a second bearing part including a slide bearing supporting rotatably a distal end portion of the drive rotation shaft;
the distal end portion is on a distal side of a portion of the drive rotation shaft to which the pump rotor is fixed; and
a second working oil introduction passage is formed to supply working oil to the second bearing part; wherein
the second bearing part includes an inner peripheral surface formed with an oil groove connected to the second working oil introduction passage; and
contact between the distal end portion of the drive rotation shaft and an inner peripheral surface of a land portion forming the second bearing part restricts inclination of the drive rotation shaft.

10. The electric oil pump as claimed in claim 9, in which the first bearing part includes an inner peripheral surface formed with an oil groove connected to the first working oil introduction passage.

11. The electric oil pump as claimed in claim 10, in which the first working oil introduction passage is configured to be supplied with working oil from the discharge port, and the second working oil introduction passage is configured to be supplied with working oil from the suction port.

12. The electric oil pump as claimed in claim 9, in which the second bearing part is in a form of a circular recess, and the distal end portion of the drive rotation shaft is accommodated in the circular recess.

13. The electric oil pump as claimed in claim 9, in which the second bearing part has an inner diameter greater than an outer diameter of the drive rotation shaft and less than an inner diameter of the first bearing part.

14. The electric oil pump as claimed in claim 9, in which a positioning mechanism is provided between the pump cover and the housing so as to position the first bearing part and the second bearing part with respect to each other.

15. The electric oil pump as claimed in claim 14, in which the positioning mechanism includes a positioning projecting portion and a positioning hole, the positioning projecting portion is formed as a circular projection in a surface of the pump cover in contact with the housing, and the positioning hole is formed as a circular hole in the pump housing part of the housing on which the positioning projecting portion abuts.

16. The electric oil pump as claimed in claim 14, in which the positioning mechanism includes a first configuration or a second configuration, the first configuration includes a positioning pin and a positioning hole, the positioning pin of the first configuration is planted in a surface of the pump cover in contact with the housing and is inserted in the positioning hole of the first configuration, the positioning hole of the first configuration is formed in a surface of the housing in contact with the pump cover, the second configuration includes a positioning pin and a positioning hole, the positioning pin of the second configuration is planted in a surface of the housing in contact with the pump cover and is inserted in the positioning hole of the second configuration, and the positioning hole of the second configuration is formed in a surface of the pump cover in contact with the housing.

* * * * *